United States Patent
Liu et al.

(10) Patent No.: US 9,256,526 B2
(45) Date of Patent: Feb. 9, 2016

(54) FLASH MEMORY STORAGE SYSTEM AND ACCESS METHOD

(71) Applicant: National Taiwan University, Taipei (TW)

(72) Inventors: Ren-Shuo Liu, Taipei (TW); Chia-Lin Yang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 234 days.

(21) Appl. No.: 13/766,362

(22) Filed: Feb. 13, 2013

(65) Prior Publication Data

US 2013/0227199 A1 Aug. 29, 2013

Related U.S. Application Data

(60) Provisional application No. 61/602,094, filed on Feb. 23, 2012.

(30) Foreign Application Priority Data

Aug. 6, 2012 (TW) .............................. 101128307 A (51) Int. Cl.
*G06F 12/02* (2006.01)
*G06F 11/10* (2006.01)

(52) U.S. Cl.
CPC ........ *G06F 12/0246* (2013.01); *G06F 11/1008* (2013.01); *G06F 11/1048* (2013.01)

(58) Field of Classification Search
CPC ............ G06F 12/0246; G06F 11/1008; G06F 11/1048; G06F 11/0793; G06F 11/1076; G06F 11/1016; H05K 999/99
USPC ....................................................... 711/103
See application file for complete search history.

(56) References Cited

U.S. PATENT DOCUMENTS 6,594,676 B1 * 7/2003 Moore ................ G06F 11/1469
6,834,326 B1 * 12/2004 Wang et al. .................... 711/114
(Continued)

FOREIGN PATENT DOCUMENTS

TW          522320      3/2003
TW    200528982      9/2005

OTHER PUBLICATIONS

Cai, Y., et al., "Flash correct-and-refresh: Retention-aware error management for increased flash memory lifetime," 2012 IEEE 30th International Conference on Computer Design (ICCD), (Sep. 30-Oct. 3, 2012), 8 pages.

(Continued)

*Primary Examiner* — Jared Rutz
*Assistant Examiner* — Khoa D Doan
(74) *Attorney, Agent, or Firm* — Huffman Law Group, PC (57) ABSTRACT

The present disclosure relates, according to some embodiments, to a data writing method in a storage system. The method comprises receiving data by the storage media controller, reading a non-volatile memory operation mode in the memory unit by a central control unit, in which the mode corresponds to a data reliability lower than the data reliability requirement of the storage system, reading a data reliability reduction condition in the memory unit by the central control unit, determining whether a system information related to the data meets the condition by the central control unit, and controlling the media control unit to write the data into the non-volatile memory according to the mode by the central control unit when the system information meets the condition.

29 Claims, 5 Drawing Sheets

(56) References Cited

U.S. PATENT DOCUMENTS

| | | | |
|---|---|---|---|
| 7,103,737 B1* | 9/2006 | Kekre | G06F 11/1456 711/161 |
| 7,177,993 B1* | 2/2007 | Kiselev | G06F 11/1435 711/162 |
| 7,428,687 B2* | 9/2008 | Klein | 714/754 |
| 7,539,838 B1* | 5/2009 | Todd et al. | 711/170 |
| 7,710,777 B1* | 5/2010 | Montierth et al. | 365/185.09 |
| 2001/0028523 A1* | 10/2001 | Moro | G11C 29/70 360/53 |
| 2002/0023202 A1* | 2/2002 | Mukherjee | G06F 9/383 712/225 |
| 2006/0156189 A1* | 7/2006 | Tomlin | G06F 11/1068 714/763 |
| 2007/0006025 A1* | 1/2007 | Onozuka et al. | 714/11 |
| 2007/0266200 A1* | 11/2007 | Gorobets et al. | 711/103 |
| 2008/0307160 A1* | 12/2008 | Humlicek | 711/113 |
| 2009/0119467 A1* | 5/2009 | Emaru | G06F 11/2069 711/162 |
| 2009/0172498 A1* | 7/2009 | Shlick et al. | 714/764 |
| 2010/0146239 A1* | 6/2010 | Gabai et al. | 711/202 |
| 2010/0205482 A1* | 8/2010 | Kaneko | 714/6 |
| 2011/0191628 A1* | 8/2011 | Noguchi et al. | 714/6.2 |
| 2012/0036412 A1* | 2/2012 | Sugawara | 714/758 |
| 2012/0047333 A1* | 2/2012 | Kottapalli | G06F 12/0822 711/146 |
| 2012/0159280 A1* | 6/2012 | Yang et al. | 714/754 |
| 2012/0198308 A1* | 8/2012 | Varnica et al. | 714/760 |
| 2013/0024734 A1* | 1/2013 | Katsuragi | G06F 3/0611 714/55 |
| 2013/0055046 A1* | 2/2013 | Blodgett | G06F 11/106 714/764 |
| 2013/0117620 A1* | 5/2013 | Joo | G11C 16/10 714/746 |
| 2013/0132638 A1* | 5/2013 | Horn | G06F 12/0871 711/103 |
| 2013/0290793 A1* | 10/2013 | Booth | G11C 29/82 714/54 |
| 2013/0318288 A1* | 11/2013 | Khan | G06F 3/0608 711/103 |
| 2014/0160842 A1* | 6/2014 | Takafuji | G11C 11/5621 365/185.03 |

OTHER PUBLICATIONS

Pan, Y., et al., "Quasi-Nonvolatile SSD: Trading Flash Memory Nonvolatility to Improve Storage System Performance for Enterprise Applications," IEEE, (2011), 10 pages.

Mohan, V., et al., "reFresh SSDs: Enabling High Endurance, Low Cost Flash in Datacenters," Department of Computer Science, University of Virginia, Technical Report CS-2012-05, (May 2012), 20 pages.

* cited by examiner

FLASH MEMORY STORAGE SYSTEM AND ACCESS METHOD

CROSS-REFERENCE TO RELATED APPLICATION(S)

This application claims priority of U.S. Provisional Patent Application No. 61/602,094, filed on Feb. 23, 2012 and Taiwan Patent Application No. 101128307 filed on Aug. 6, 2012, the disclosures of which are hereby incorporated by reference in their entirety.

BACKGROUND OF THE DISCLOSURE

1. Field of the Disclosure

The present disclosure generally relates to a design of a storage system and its access methods, and more particularly to a flash memory storage system and its access methods.

2. Description of the Related Art

Storage systems store various types of data including images, videos, programs, databases, etc. Therefore, storage systems need to guarantee a certain degree of data reliability. That is, users will not accept storage systems where data stored inside the storage system can be easily lost or have errors. The metrics used to evaluate data reliability of storage systems include unrecoverable bit error rate ("UBER," also known as uncorrectable bit error rate) and data retention. Throughout the disclosure, U and T will be used to denote the required UBER and data retention, respectively. That is, for each data bit written into storage systems, the chance that the bit is erroneous is required to be lower than U throughout the period of T after the bit is written.

Recently, non-volatile memory ("NVM") has been widely used in storage systems as a portion or all of the storage media. For example, solid state drives ("SSD") completely use NVM to construct the storage media, and hybrid disks and hybrid arrays use both NVM and hard disks to construct the storage media. NVMs can serve as both storage memory to store data and caches for the hard disk in a hybrid storage system to increase the data access performance. SSD cache cards can also be installed in the server side or the storage side to use the NVM as the cache of the storage system.

Non-volatile memory includes various types of memory technologies including Flash memory, phase-change memory ("PCM"), memristor, spin transfer torque RAM ("STT-RAM"), etc. Among the NVM mentioned above, Flash memory is the most widely used memory technology in storage systems nowadays.

Non-volatile memory in storage systems also needs to guarantee a certain degree of data reliability (i.e., data retention and UBER). For example, according to industrial standards, the data retention may need to be higher than 3 months, 1 year, or even 10 years, and the UBER needs to be lower than a value between $10^{-13}$ and $10^{-16}$. However, such degree of data reliability is generally achieved at the expense of performance, lifetime, and/or cost. In order to achieve long data retention and low UBER, NAND Flash has a longer write latency and limited endurance and requires a complicated data encoding scheme. For example, in a recent Flash specification, the write latency has increased from 0.2 ms to 1.3 ms; the endurance has decreased from 100,000 times to only 3,000 times; and the required strength of the error correction code ("ECC") has increased from correcting 4 bits of errors in every 528 bytes of data to correcting 24 bits of errors in every 1080 bytes of data. Even more complex ECCs such as low density parity check codes ("LDPC codes") may also be required. A complex ECC has disadvantages of increasing the data size, complicating the encode/decode hardware, increasing the hardware cost, lengthening the encode/decode time, and increasing the power consumption, each of which contribute to high cost, poor performance, and limited lifetime for a storage system.

Therefore, a new storage system and access methods that can lower the cost or increase the lifetime and the performance of the system while keeping the data reliability are desired.

SUMMARY OF THE DISCLOSURE

One object of the present disclosure is to provide a data writing method in a storage system. According to one embodiment of the present disclosure, the storage system comprises a storage media controller and a non-volatile memory. The storage media controller comprises a central control unit, a memory unit, and a media control unit. The method comprises the steps of receiving a data by the storage media controller; reading a non-volatile memory operation mode in the memory unit by the central control unit, in which the mode corresponds to a data reliability lower than the data reliability requirement of the storage system; reading a data reliability reduction condition in the memory unit by the central control unit; determining whether a system information relating to the data meets the condition by the central control unit; and controlling the media control unit to write the data into the non-volatile memory according to the mode by the central control unit when the system information meets the condition.

In one embodiment, the object of the present disclosure is to provide a data reading method in a storage system. The storage system comprises a storage media controller and a NVM, the storage media controller comprises a central control unit. The method comprises the steps of retrieving, by the storage media controller, a data from the non-volatile memory; determining, by the central control unit, whether the data have a replica and need an error detection check; if the data have a replica and need the error detection check, the central control unit uses an error detection code associated with the data to check whether the data have an error; if the data have no error, then the data is outputted; and if the data have an error, then the replica is outputted.

In one embodiment, the object of the present disclosure is also to provide a storage system. The storage system comprises a storage media and a storage media controller. The storage media comprises a NVM. The storage media controller is connected with the NVM. The storage media controller comprises a memory unit, a media control unit, and a central control unit. The memory unit stores a NVM operation mode and a data reliability reduction condition, wherein the corresponding data reliability of the mode is lower than the data reliability requirement of the storage system. The media control unit is connected with the NVM. The central control unit is connected with the memory unit and the media control unit, wherein the central control unit determines whether a system information associated with the data meets the condition when the storage media controller performs a data writing operation, and if the system information meets the condition, the central control unit controls the media control unit to write the data into the NVM based on the mode.

Therefore, the present disclosure offers the advantage of providing a new storage system and access methods to increase data reliability, lifetime, and performance, while can also lowering the cost of the storage system.

DETAILED DESCRIPTION OF EMBODIMENTS

The following description is of the best-contemplated mode of carrying out the disclosure. This description is made for the purpose of illustrating the general principles of the disclosure and should not be taken in a limiting sense. The scope of the disclosure is best determined by reference to the appended claims.

Reference will be made in detail to the present embodiments, examples of which are illustrated in the accompanying drawings. Wherever possible, the same reference numbers are used in the drawings and the description to refer to the same or like parts.

Figure 1:
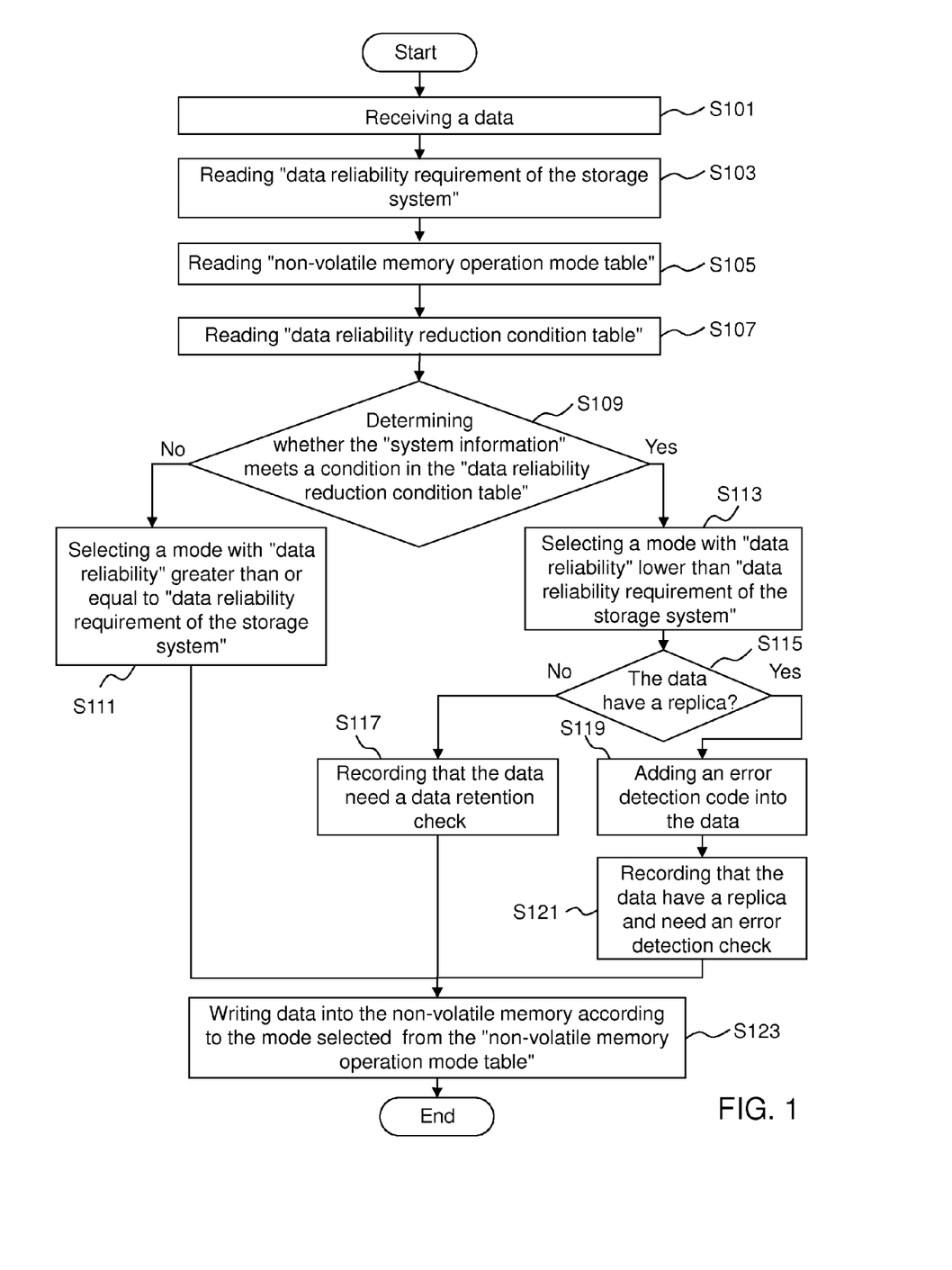
FIG. 1 illustrates a flow chart of a data writing method of a storage system according to one embodiment of the present disclosure.
Figure 2A:
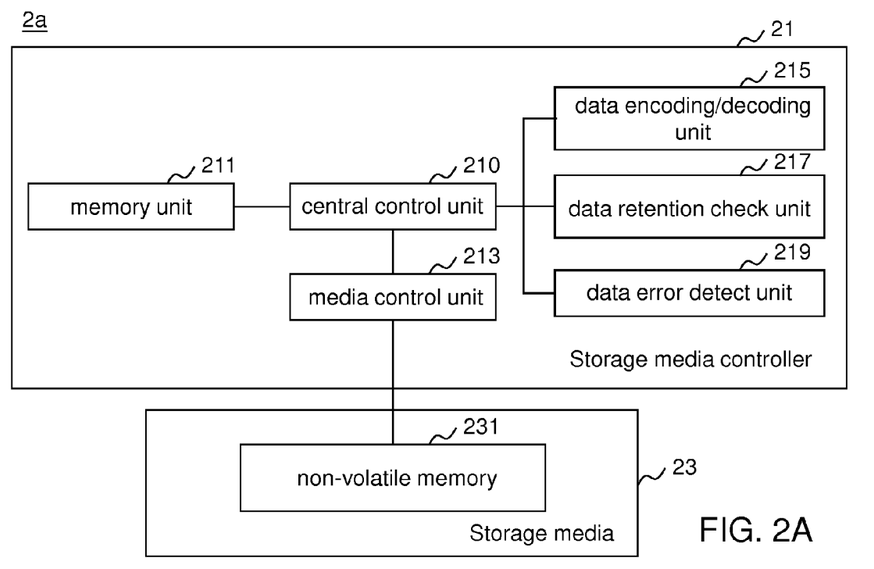
FIG. 2A illustrates a system block diagram of a storage system according to one embodiment of the present disclosure.
Figure 2B:
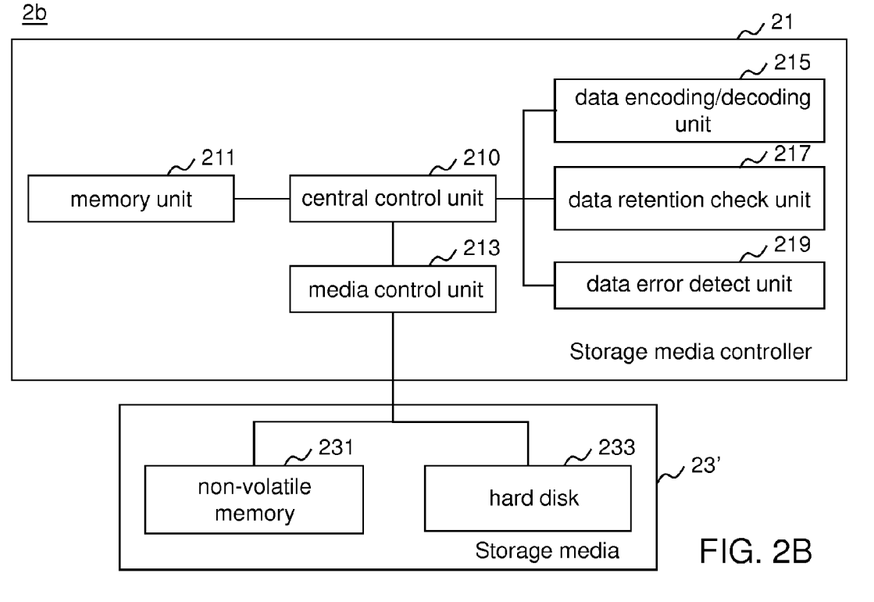
FIG. 2B illustrates a system block diagram of a storage system according to another embodiment of the present disclosure.

Referring now to FIG. 1A which illustrates a flow chart of a data writing method of a storage system according to one embodiment of the present disclosure. FIGS. 2A and 2B illustrate system block diagrams of the embodiments of the present disclosure. As shown in FIG. 2A, a storage system 2a comprises a storage media controller 21 and a storage media 23, wherein the storage media controller 21 includes a central control unit 210, a memory unit 211, a media control unit 213, a data encoding/decoding unit 215, a data retention check unit 217, and a data error detect unit 219. The memory unit 211, the media control unit 213, the data encoding/decoding unit 215, the data retention check unit 217, and the data error detect unit 219 are respectively connected to the central control unit 210. The storage media 23 includes a NVM 231, and the NVM 231 is connected with the media control unit 213. According to one embodiment as shown in FIG. 2B, a storage system 2b is essentially the same as the storage system 2a in FIG. 2A, except that the storage media 23' further comprises a hard disk 233, and the hard disk 233 is connected with the media control unit 213.

More specifically, the central control unit 210 can be a unit that can perform condition determination and flow control operations including a central processing unit ("CPU"), a micro control unit ("MCU"), a finite state machine, etc. The memory unit 211 can be random access memory ("RAM"), DRAM, SRAM, registers, read only memory ("ROM"), etc. which can store data, codes, flags and variables.

The media control unit 213 can be a finite state machine, a mixed-signal integrated circuit, etc. which can perform signal conversion and command translation to access the NVM 231 and hard disk 233.

The data encoding/decoding unit 215 can be a CPU, a MCU, a digital signal processor ("DSP"), linear feedback shift registers, etc. that can encode error correction codes, encode error detection codes, perform error detection check, and perform error correction algorithms. The error correction codes can be various types of codes including linear block codes, cyclic codes, convolutional codes, concatenated codes, turbo codes, etc. The data retention check unit 217 can be a timer unit, a real-time clock ("RTC"), etc. which can provide timing information to periodically trigger the central control unit 210.

The data error detect unit 219 can be a central processing unit (CPU), linear feedback shift registers, etc. which can perform error detection through using error detection codes. The NVM 231 can be various types of memories using floating gates or charge trapping mechanism to store data, including NAND Flash, 3D NAND Flash, etc.

The hard disk 233 can be storage media including a hard disk drive ("HDD"), a hard disk platter, a hard disk array, etc. The storage media controller 21 can be various types of devices that can manage or access the NVM 231 and hard disk 233 including a server, a distributed server, an embedded system, etc.

More specifically, according to the embodiments of the present disclosure, the storage media controller 21 can dynamically reduce the data reliability of the data to be stored into the NVM to a degree lower than the data reliability requirement of the storage system (e.g. by reducing the data retention, increasing the UBER, or doing the both) when the central control unit 210 determines that there is a data reliability reduction condition occurred. By doing this, the overhead of the performance and the cost to achieve high data reliability is reduced, and the system lifetime and the system performance is increased.

According to one embodiment of the present disclosure, the method of writing data into the storage system 2a and 2b comprises the following steps. First, the storage media controller 21 receives a data to be written into the NVM 231 in S101. During the data transfer, the central control unit 210 reads system information related to the data such as performance sensitivity, data lifetime, whether the data have a replica or not, and data size. The source of the system information can be from the memory unit 211, the registers of the storage media controller 21, or implicitly from the procedure of accessing the data.

Next, the central control unit 210 reads the data reliability requirement information of the storage system at S103, reads a NVM operation mode table at S105, and reads a data reliability reduction condition table at S107. S103, S105, and S107 are different steps, and the order of these steps are interchangeable. The data reliability requirement of the storage system can be inputted from an external system or stored in the memory unit 211 in advance. The data reliability requirement of the storage system represents the acceptable data retention and unrecoverable bit error rate (UBER), which can be determined by user's configuration. For example, according to one specification, the data retention is required to be longer than 10 years and the unrecoverable bit error rate (UBER) is required to be lower than $10^{-16}$.

The NVM operation mode table and the data reliability reduction condition table can be stored in the memory unit 211 in advance. The NVM operation mode table can include several operation modes, wherein each mode corresponds to a certain level of data reliability. More specifically, Table 1 illustrates an example memory operation mode table. Different operating modes respectively correspond to different combinations of write number, write latency, and encoding scheme, wherein the write number corresponds to the degree of wear-out of the NVM 231 (i.e., a wear-out limit), the write latency corresponds to the write speed of the data written into the NVM 231, and the encoding scheme corresponds to different strength of error correction codes. According to the characteristics of NVM, an address in NVM with a higher degree of wear-out means that the memory address has lower data reliability. In addition, a higher write speed and a less strong error correction code also lead to lower data reliability. In one embodiment, the operation mode includes a control command of the NVM, and the command corresponds to a particular write speed.

For example, mode A has a lower write number limit, longer write latency, and a stronger encoding scheme compared with mode B, as shown in Table 1, wherein mode A corresponds to higher data reliability compared with mode B. In another example, mode B has the same write number limit and write latency as mode C, but mode C has a stronger encoding scheme compared with mode B. The encoding scheme of mode C is a concatenated error correction code that includes a BCH code and an LDPC code, but the encoding scheme of mode B is only the BCH code portion of the concatenated error correction code; therefore, mode C corresponds to higher data reliability compared with mode B.

The number of operation modes does is not limited to three as shown in Table 1. The data reliability of each operation mode of the NVM can be obtained from the NVM's manufacturer's specification or from the empirical testing results of the NVM.

Due to the presence of the NVM operation mode table of the present disclosure, the storage media controller 21 is able to dynamically reduce the data reliability of the data to be stored into the NVM. That is, the storage media controller 21 of the present disclosure can select different operation modes, such as different encoding schemes or different write latencies, to reduce the resulting data reliability. Therefore, the present disclosure can reduce the cost and increase the lifetime and the performance of storage systems without the need of dividing the NVM into different segments with different levels of data reliability.

According to one embodiment, the NVM 231 can receive different write commands which control the amplitude of step voltage in the incremental step pulse programming (ISPP) procedure of the NVM for different modes with different write latencies. That is, the operation mode can include write commands.

According to one embodiment, the data encoding/decoding unit 215 can add a concatenated code into the data, wherein the concatenated code comprises a first error correction code and a second error correction code. The data encoding/decoding unit 215 receives a control signal from the central control unit 210, wherein the control signal controls the data encoding/decoding unit 215 to only add the first error correction code into the data but the second error correction code for a different encoding scheme. That is, the operating mode can include a control signal.

TABLE 1

| Mode | Write Number Limit | Write Latency (msec.) | Encoding Scheme |
| --- | --- | --- | --- |
| A | smaller than 3000 | 0.5 | BCH code that can correct 24 bits of error in a 1080-byte codeword |
| B | smaller than 100,000 | 0.2 | BCH code that can correct 4 bits of error in a 528-byte |

TABLE 1-continued

| Mode | Write Number Limit | Write Latency (msec.) | Encoding Scheme |
| --- | --- | --- | --- |
| | | | codeword |
| C | smaller than 100,000 | 0.2 | Concatenating an LDPC code with a BCH code and the BCH code can correct 4 bits of error in a 528-byte codeword |

The data reliability reduction condition table can include several conditions. If a condition in the table is met, it is beneficial for a storage system to lower the data reliability when data are written. The conditions can be performance sensitivity, data lifetime, and whether data have a replica or not, etc. as shown in Table 2. Each condition can correspond to at least one case, but not limited to the ones shown in Table 2.

TABLE 2

| Condition | Case Description |
| --- | --- |
| Data have a high data performance sensitivity | The written data are from an external system. When the data are written, the amount of data that are in buffer memory and waiting to be written is greater than a threshold. |
| Data have short data lifetime | The written data are from an external system. According to the history of written addresses, the data lifetime of the written data is less than 30 days. NVM serves as a cache of a hard disk, and the data written into the NVM are received during hard disk accesses. |
| Data have a replica | The storage media controller decompresses compressed data in the NVM and then writes the decompressed data into the NVM. NVM serves as a cache of a hard disk, and the storage media controller reads the data from the hard disk then writes the data into the NVM. NVM serves as a cache of a hard disk, and the storage media controller writes the data into the hard disk and also writes the data into the NVM. |

According to one embodiment, the condition to reduce the data reliability includes that the written data has a high data performance sensitivity. So-called high data performance sensitivity means that the performance of writing the data is important. For example, when the written data are input from an external system, the write latency and throughput of the storage system can directly affect the performance of the external system; therefore, the data performance sensitivity is high. In contrast, if the data writing operation is internal to the storage system, such as wear leveling, garbage collection, or refresh, since those write operations are background activities, their data performance sensitivity is low. For another example, when the data are written, if the amount of data that is in buffer memory and waiting to be written into the storage media is greater than or equal to a threshold, the completion of the current data write can impact the queuing delay of more subsequent data write operations; therefore, the data performance sensitivity of the current write is high. In contrast, if the amount of data that is in buffer memory and waiting to be written into the storage media is less than the threshold, the data performance sensitivity of the current write is low.

According to one embodiment, the condition to reduce the data reliability includes that the written data have a short data lifetime. So-called short data lifetime means that the data have a high probability to be erased, updated, or overwritten within a short period of time. For example, in some data center environments, when the written data are inputted from the external system, there is an 80% of chance that those data will be overwritten within 7 days; therefore, the data lifetime is short. In contrast, if the data writing operation is internal to the storage system, such as wear leveling, garbage collection, or refresh, since those write operations involve cold data which have been stored in the storage media for a period of time, they have a higher probability of staying in the storage system for a longer period; therefore, the data lifetime is long. Furthermore, the data lifetime can be estimated from the history of the storage system. For example, the storage system can record writes to a specific address to determine the average data lifetime relating to that address. When the average data lifetime relating to an address is smaller than a predetermined threshold, for example 30 days, one can then predict that the subsequent data written into that address have short lifetime as well. There is one more example. If the NVM 231 serves as the cache of the hard disk 233, one can determine that the lifetime of the data written into the NVM 231 is short because data written into a cache are replaced frequently.

According to one embodiment, the condition to reduce the data reliability includes that the data have a replica. The situation that data have a replica is that there are identical or substantially identical data that are reliable in the storage system. Therefore, when errors are present in the data, the correct data can be retrieved through the replica itself or through re-computing the replica. For example, a storage system may store data in a compressed form in the hard disk 233 for capacity saving and keep a decompressed version of the frequently used data in the NVM 231 for performance optimization. In this case, the data in the NVM 231 have a replica, i.e., the compressed data in the hard disk. Therefore, once data stored in the NVM 231 are corrupted due to errors, the correct data can be obtained through decompressing the compressed data in the hard disk 233. Furthermore, if the NVM 231 serves as the cache of the hard disk 233, and the data written into the NVM 231 are from the requests that access the hard disk, the data written into the NVM 231 have a replica inside the hard disk 233. Once the data in the NVM 231 are corrupted due to errors, the correct data can be retrieved from the replica in the hard disk 233.

After reading the data reliability requirement of the storage system, the NVM operation mode table, and the data reliability reduction condition table, the central control unit 210 determines whether the system information meets one of the conditions in the data reliability reduction condition table in S109. If the system information does not meet any of the conditions, the central control unit 210 chooses a mode in the NVM operation mode table (e.g., among A, B or C in Table 1) whose corresponding data reliability is greater than or equal to the data reliability requirement of the storage system in S111 (e.g., mode A). If the system information meets one of the conditions, the central control unit 210 chooses a mode in the NVM operation mode table whose corresponding data reliability is lower than the data reliability requirement of the storage system in S113 (e.g., mode B). That is, based on different characteristics of the data, the storage media controller 21 can dynamically select different operation modes for the NVM to reduce the cost and to increase the lifetime and the performance of the storage system. If the central control unit 210 chooses a mode with its corresponding data reliability greater than or equal to the data reliability requirement of the storage system from the table, then the central control unit 210 controls the media control unit 213 to write the data into the NVM 231 according to the selected mode in S123.

If the system information meets one of the conditions, the central control unit 210 further determines whether the data have a replica in step S115. The existence of a replica can refer to the aforementioned description as shown in Table 2.

If the central control unit 210 determines that the data have a replica, the central control unit 210 controls the data encoding/decoding unit 215 to encode the data with an error detection code (i.e., adding an error detection code into the data) in S119 and records that the data have a replica and need an error detection check in S121. More specifically, the error detection operation is performed by the data error detect unit 219. When receiving the data, the central control unit 210 stores a flag in the memory unit 211 according to the characteristics of the data to denote whether the data have a replica and need an error detection check.

According to one embodiment, the error detection code can be the cyclic redundancy check ("CRC") code. In addition, error correction codes ("ECCs") can also provide a certain degree of error detection capability. The error detection capability should meet the UBER requirement of the storage system. For example, if the UBER requirement of the storage system is $10^{-16}$ and a 70-bit error detection code is added into every 8K-byte data, the maximum number of error bits in 8K bytes of data is $2^{16}$, and there is a $2^{-70}$ of probability that the errors in the data cannot be detected. Therefore, the worst resulting UBER is $2^{16}$ times $2^{-70}$, which can meet the UBER requirement of the storage system (i.e., $10^{-16}$).

If the central control unit 210 determines that the data do not have a replica, the central control unit 210 records that the data needs a data retention check in S117. More specifically, the data retention check operation is periodically performed by the data retention check unit 217 that triggers the central control unit 210 to check whether the data written into the NVM 231 are about to run out of retention capability. The data retention check unit 217 can also periodically trigger the central control unit 210 to control the media control unit 213 to rewrite the data that require the data retention check into the storage media (i.e., 23 or 23') with data reliability greater than or equal to the data reliability requirement of the storage system. For example, the data retention check can take place by, but not limited to, every 0.1 second, 1 second, 1 minute, or 10 minutes. In one embodiment, when writing data into the NVM 231, the central control unit 210 also records a flag in the memory unit 211 based on the characteristics of the data to denote whether the data need a data retention check in the future. Moreover, the flag can comprise multiple bits to distinguish data written during different time periods. Furthermore, the flags can be stored into the NVM 231 as well.

After the central control unit 210 records that the data need a data retention check in S117 or records that the data have a replica and need an error detection check in S121, the central control unit 210 controls the media control unit 213 to write the data into the NVM 231 according to the selected mode in S123, in which the selected mode corresponds to data reliability lower than the data reliability requirement of the storage system.

According to one embodiment, the step that the media control unit 213 writes the data into the NVM 231 based on the selected mode at S123 includes two steps. First, the central control unit 210 controls the media control unit 213 to select an memory address whose wear-out degree meets the wear-out degree corresponding to the selected mode in the NVM 231. Then, the central control unit 210 controls the data encoding/decoding unit 215 to add an error correction code into the data based on the encoding scheme of the selected mode; last, the central control unit 210 controls the media control unit 213 to write the data into the selected address of the NVM 231 with the write speed corresponding to the selected mode.

According to one embodiment, if the system information meets the condition that the data performance sensitivity is high, which means that it is advantageous to write the data into the NVM 231 with a higher speed, the central control unit 210 can select a mode whose encoding scheme is less strong to reduce the loading of the data encoding/decoding unit 215, or select a mode that corresponds to a higher write speed to finish the data writing operation as soon as possible. By lowering the retention of the data written into the NVM 231, the cost can be reduced and the performance can be improved.

According to one embodiment, if the system information meets the condition that the data have short data lifetime, which means that the data have a high probability of not needing long retention, the central control unit 210 can select a mode corresponding to a higher write number (i.e., a higher wear-out degree), select a mode corresponding to a less-strong encoding scheme, or select a mode corresponding to a higher write speed, to perform the data writing operation. By doing this, the retention capability of the data written into the NVM 231 is lowered, and the cost can thus be reduced, and the lifetime and the performance can thus be improved.

According to one embodiment, if the system information meets the condition that the data have a replica, i.e., the data can be retrieved using the replica even when the data have errors later on. In this case, the data do not demand a very low UBER, and the central control unit 210 can thus select a mode corresponding to a memory address with a high wear-out degree, select a mode corresponding to a less-strong encoding scheme, or select a mode corresponding to a higher write speed, to perform the data writing operation. By doing this, the UBER of the data written into the NVM 231 is raised, and the cost can thus be reduced, and the lifetime and the performance can thus be improved, too.

According to one embodiment, checking data retention may include one or more steps. For example, first, the central control unit 210 selects a piece of data. If the data are not yet invalidated, overwritten, or erased and are about to run out of retention capability, the central control unit 210 controls the media control unit 213 to use a mode with high data reliability, such as adding a strong error correct code into the data or using a low write speed, to again write the data into the NVM 231. Therefore, the storage media systems 2a and 2b can maintain their data reliability.

The NVM operation mode table and the data reliability reduction condition table mentioned in the above embodiments can be, but not limited to, a table structure. They can also be various types of data structures, including an array, a tree, a linked list, etc. They can also be implemented using the flow-control statements or the switch statements of programs. Furthermore, according to one embodiment, the data reliability reduction condition table contains only one condition, e.g., the data has a replica.

Figure 3:
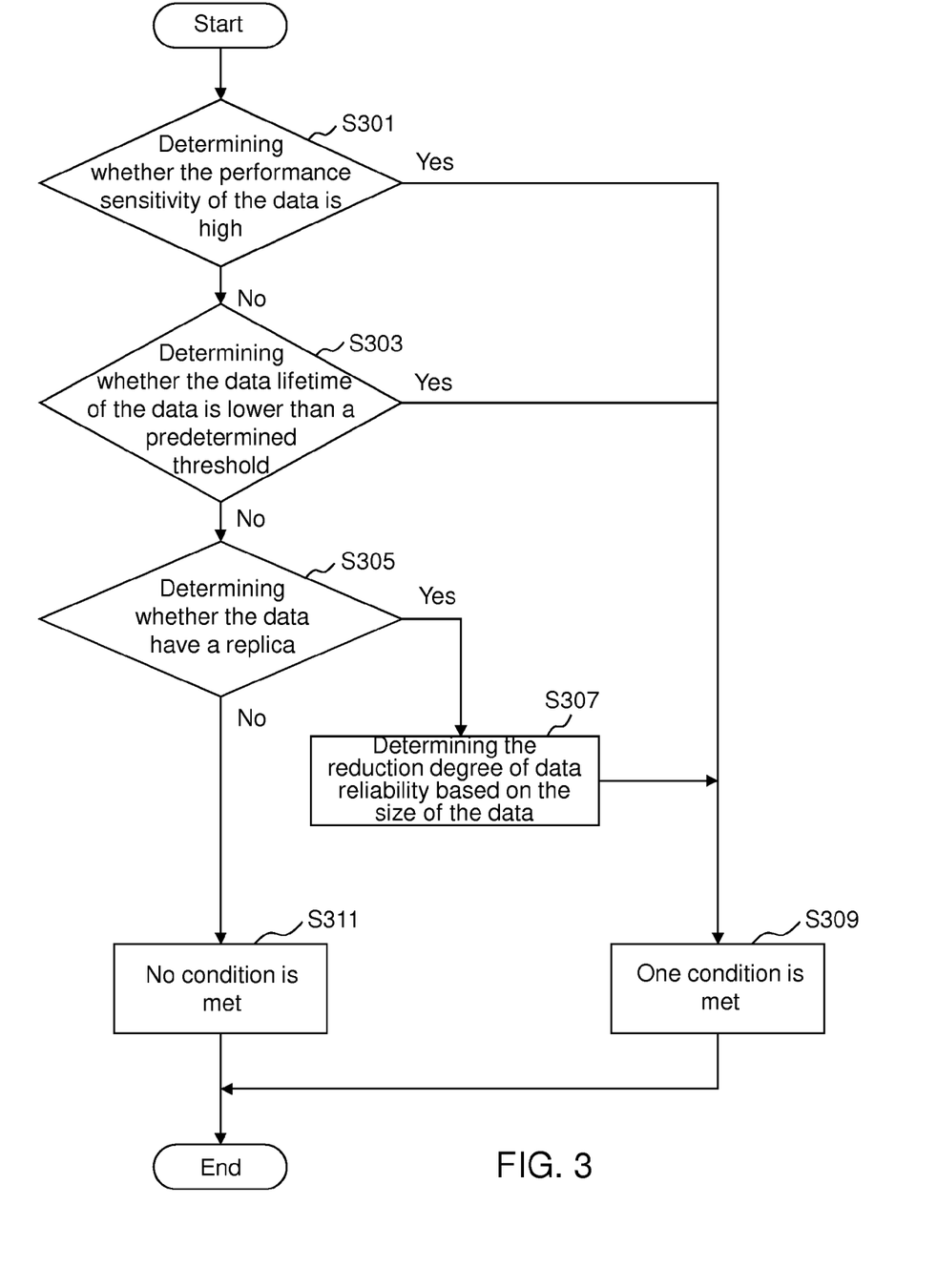
FIG. 3 illustrates additional details about steps of determining whether system information meets data reliability reduction condition in the table according to one embodiment of the present disclosure.

FIG. 3 illustrates the additional details about the steps of determining whether the system information meets the conditions in the data reliability reduction condition table according to one embodiment of the present disclosure. First, the central control unit 210 determines whether the data have a high performance sensitivity in S301. For example, the central control unit can determine whether the data have a high performance sensitivity based on whether the data written into the NVM 231 are from an external system. If the result is true, it means that the data have a high performance sensitivity. In another example, the central control unit 210 can determine whether the data have a high performance sensitivity based on whether the amount of data that wait to be written into the NVM 231 is greater than or equal to a predetermined threshold. If the result is true, it means that the data have a high performance sensitivity. When the system information implies that the data have a high performance sensitivity, the central control unit 210 determines that one condition is met in S309.

If the central control unit 210 determines that the data does not have a high performance sensitivity, the central control unit 210 continues to determine whether the estimated lifetime of the data is lower than a predetermined value in S303. For example, the estimated lifetime can be obtained based on the address of the NVM which the data are to be written into. More specifically, the memory unit 211 of the storage media controller 21 contains the history of the data lifetime associated with each address. If the central control unit 210 determines that the estimated lifetime is lower than the predetermined value, the central control unit 210 determines that the condition is met in S309.

Figure 4:
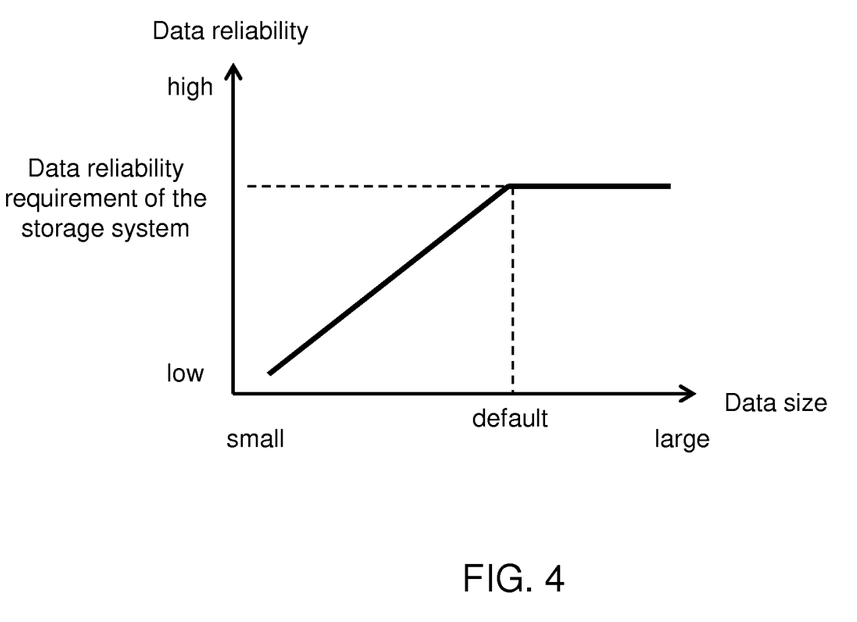
FIG. 4 illustrates a graph of a relationship between data size and data reliability according to one embodiment of the present disclosure.

If the central control unit determines that the estimated lifetime is not lower than a predetermined value, the central control unit 210 continues to determine whether the data have a replica in S305. If the data have a replica, the central control unit 210 further determines the reduction degree of data reliability based on the size of the data in S307. Furthermore, as shown in FIG. 4, if the data size is small, then the data reliability can be reduced to a lower value. For example, if the data size is $10^6$ bits, then the UBER can be increased from the required $10^{-16}$ to $10^{-9}$. Once the UBER is increased, the probability of retrieving the correct data using the replica due to an error in the $10^6$-bit data is about $10^{-9}$ times $10^6$, i.e., once in every 1000 times, which only leads to insignificant overhead for the system. Similarly, if the data size is $10^4$ bits, the UBER can be increased from the required $10^{-16}$ to $10^{-7}$. The probability of retrieving the correct data using the replica is preferably controlled in the range of $10^{-16}$ to 20%, for example, 10%, 5%, 1%, 0.1%, 0.01%, etc.

If the central control unit 210 determines that the data does not have a replica, then the central control unit 210 decides that the system information does not meet any of the conditions in S311.

With the present disclosure, the central control unit 210 can dynamically select the operating mode of the NVM according to the system information and the data reliability reduction condition table to reduce the cost and increase the lifetime and performance.

Figure 5:
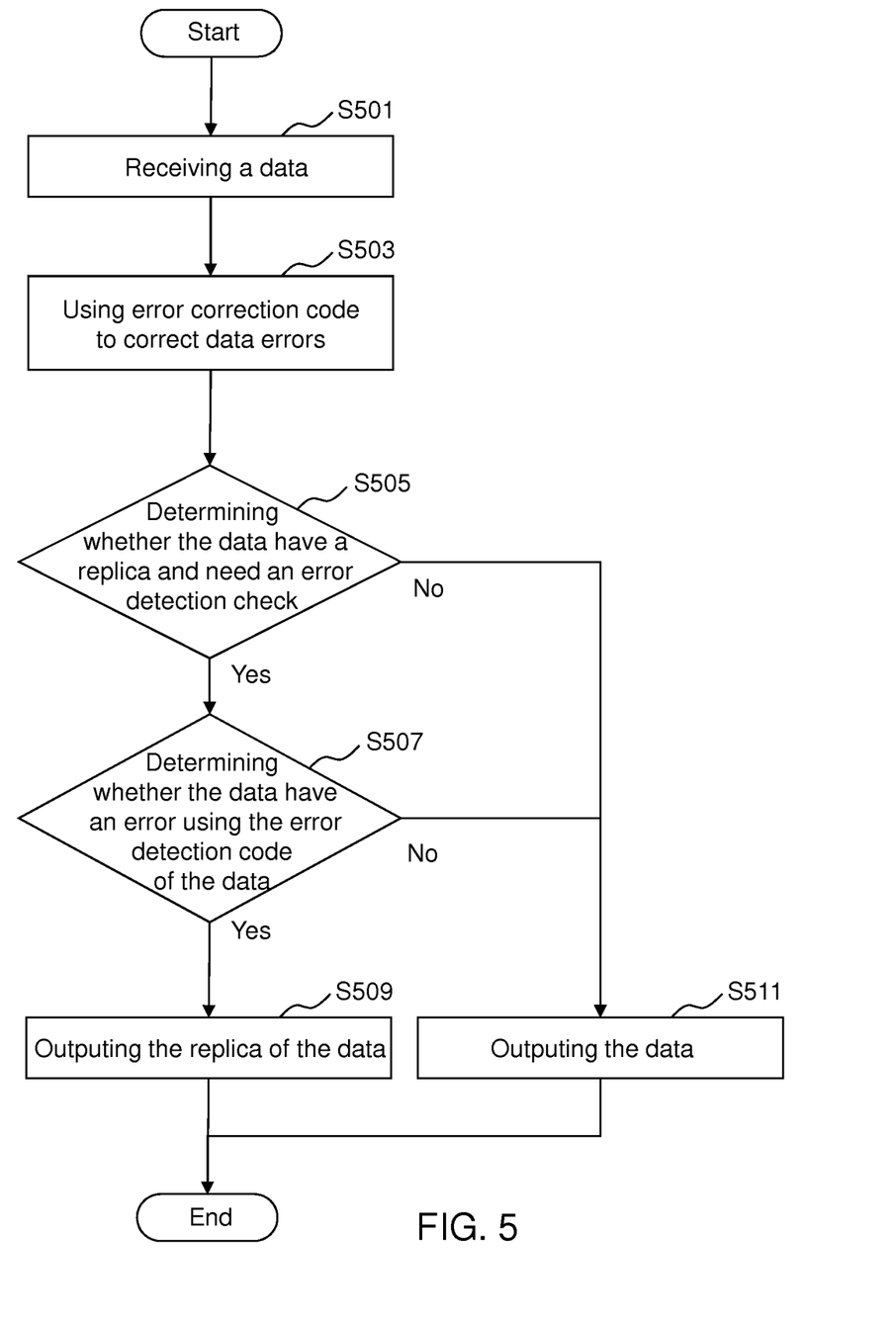
FIG. 5 illustrates a flow chart of a data reading method of a storage system according to one embodiment of the present disclosure.

FIG. 5 illustrates the flow chart of reading data in the storage system according to one embodiment of the present disclosure. Please also refer to FIGS. 2A and 2B which are the system block diagrams of the present disclosure. First, the storage media controller 21 retrieves data from the NVM 231 in S501. The data can be written into the NVM 231 using the method described in FIG. 1. Then, the central control unit 210 controls the data encoding/decoding unit 215 to correct data errors using the error correction code of the data in S503. According to one embodiment, if the data does not have any errors, the encoding/decoding unit 215 maintains the original data. If the data have errors and the number of errors is within the error correction code's capability, all errors are corrected. On the other hand, if the data have errors and the number of errors is beyond the error correction code's capability, not all of the errors can be corrected (i.e., some errors still remain in the data).

Then, the central control unit 210 determines whether the data have a replica and need an error detection check in S505. If the determination is false, the storage media controller 21 outputs the data in S511. If the data have a replica and need an error detection check, the central control unit 210 controls the data error detect unit 219 to detect whether there is an error in the data using the error detect code in S507. If the data have no errors, the storage media controller 21 outputs the data in S511, otherwise, the storage media controller 21 retrieves the replica of the data and outputs the replica of the data in S509.

When writing the data, the central control unit 210 can store a flag in the memory unit 211 to denote whether the data have a replica and need an error detection check according the characteristics of the data. The situation wherein data have a replica has been described above (e.g., Table 2).

Therefore, according to the embodiments above, the storage system and its data accessing methods of the present disclosure discloses how to dynamically select the operating mode of a portion or all of the NVM to reduce the cost and increase the lifetime and the performance of storage system.

In the above embodiments, determining the condition (including S109, S115, S301, S303, S305, S505, and S507) can be either explicit or implicit. For example, the central control unit 210 can determine whether a condition holds true or holds false for a period time at once instead of determining the condition for several times. In another example, the central control unit 210 can also determine whether a condition holds true or holds false for multiple pieces of data instead of determining the condition for each piece of data respectively.

Realizations in accordance with the present disclosure have been described in the context of particular embodiments. These embodiments are meant to be illustrative and not limiting. Many variations, modifications, additions, and improvements are possible. In the embodiments described above, the NVM 231 can be various types of other memory devices such as phase-change memory ("PCM"), memristor, spin transfer torque RAM ("STT-RAM"), etc. The hard disk 233 can be other types of storage media such as tapes, hard disk platters, hard disk arrays, or optical media like Compact Discs ("CDs"). Accordingly, plural instances may be provided for components described herein as a single instance. Structures and functionality presented as discrete components in the exemplary configurations may be implemented as a combined structure or component. These and other variations, modifications, additions, and improvements may fall within the scope of the disclosure as defined in the claims that follow.

As may be used herein, the terms "substantial," "substantially," "approximate," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A data writing method in a storage system including a storage media controller and a non-volatile memory which is not divided into a plurality of segments respectively corresponding to the plurality of data reliability levels, wherein the storage media controller comprises a central control unit, a memory unit, and a media control unit, the method comprising:

receiving a data by the storage media controller;

reading a non-volatile memory operation mode table comprising at least two modes, a first mode corresponding to a data reliability requirement of the storage system and a second mode corresponding to a second data reliability lower than the data reliability requirement of the storage system, in the memory unit by the central control unit and a data reliability reduction condition table comprising at least one condition in the memory unit by the central control unit;

determining whether a system information relating to the data meets one of the at least one condition in the data reliability reduction condition table by the central control unit; and controlling the media control unit to select an address meeting a wear-out limit of at least the second mode of the at least two modes in the non-volatile memory and write the data into the address of the non-volatile memory according to the second mode by the central control unit when the system information meets the condition.

2. The method according to claim 1, wherein the data reliability requirement is inputted from an external system and stored in the memory unit.

3. The method according to claim 1, wherein the data reliability requirement comprises a data retention and an unrecoverable bit error rate, wherein the data retention is from 3 months to 10 years, and the unrecoverable bit error rate is from $10^{-13}$ to $10^{-16}$.

4. The method according to claim 1, wherein the storage media controller further comprises a data encoding/decoding unit, each of the modes in the non-volatile memory operation mode table corresponds to a combination of a wear-out limit, a write speed, and an encoding scheme, and the step of controlling the media control unit to write the data into the non-volatile memory according to the second mode by the central control unit comprises:

controlling the data encoding/decoding unit to add an error correction code into the data by the central control unit based on the encoding scheme corresponding to the second mode; and controlling the media control unit to write the data into the address of the non-volatile memory by the central control unit based on the write speed corresponding to the second mode.

5. The method according to claim 1, wherein the storage media controller further comprises a data encoding/decoding unit, and when the system information meets the at least one condition, the central control unit further determines another condition to check whether the data has a replica, and then if the data has a replica, the central control unit controls the data encoding/decoding unit to add an error detection code into the data and records that the data has a replica and need an error detection check, wherein the error detection capability of the error detection code meets the unrecoverable bit error rate requirement of the storage system.

6. The method according to claim 5, wherein if the data do not has a replica, the central control unit records that the data needs a data retention check.

7. The method according to claim 5, wherein the storage system further comprises a hard disk, and the condition that the data has a replica comprises that the storage media controller receives the data through accessing the hard disk and writes the data into the non-volatile memory.

8. The method according to claim 1, wherein the condition comprises that the data have has a replica.

9. The method according to claim 8, wherein the method further comprises determining the reduction degree of the data reliability based on the data size, and when the system information meets the condition that the data has a replica, the central control unit further determines the reduction degree of the data reliability based on the data size.

10. The method according to claim 8, wherein the storage system further comprises a hard disk, and the condition that the data have has a replica comprises that the storage media controller receives the data through accessing the hard disk and writes the data into the non-volatile memory.

11. The method according to claim 1, wherein at least one of the non-volatile memo operation mode table and the data reliability reduction condition table is an information in a form of one of a table structure, an array, a tree or a linked list.

12. The method according to claim 1, wherein at least one of the non-volatile memory operation mode table and the data reliability reduction condition table is an information in a form of one of a flow-control statement or a switch statement of a program.

13. The method according to claim 1, wherein the at least one condition in the data reliability reduction condition table comprises that the data has a high performance sensitivity and the data has a short data lifetime.

14. The method according to claim 1, wherein the at lease one condition in the data reliability reduction condition table comprises that the data is inputted from an external system, and the mode comprises a non-volatile memory control command corresponding to a write speed.

15. The method according to claim 1, wherein the at least one condition in the data reliability reduction condition table comprises that the data is inputted from an external system, and the mode comprises an encoding scheme, wherein the encoding scheme corresponds to a portion of a concatenated error correction code, and the portion of the concatenated error control code corresponds to a data reliability lower than the data reliability requirement of the storage system.

16. An access method in a storage system comprising a storage media controller and a non-volatile memory, wherein the storage media controller comprises a central control unit, the storage media controller comprises a memory unit, the method comprising:

writing a data into the non-volatile memory, comprising:
receiving the data by the storage media controller;
reading a non-volatile memory operation mode table comprising at least two modes, a first mode corresponding to a data reliability requirement of the storage system and a second mode corresponding to a second data reliability lower than the data reliability requirement of the storage system, in the memory unit by the central control unit and a data reliability reduction condition table comprising at least one condition in the memo unit b the central control unit;
determining whether a system information relating to the data meets one of the at least one condition in the data reliability reduction condition table by the central control unit; and
controlling the media control unit to select an address meeting a wear-out limit of at least the second mode of the at least two modes in the non-volatile memory and write the data into the address of the non-volatile memory according to the second mode by the central control unit when the system information meets the condition; and
generating a flag to be stored in the memory unit to represent that the data reliability of the data is lower than the data reliability requirement of the storage system by the central control unit; and
reading the data from the non-volatile memory, comprising:
retrieving, by the storage media controller, the data from the non-volatile memory;
determining, by the central control unit, whether the data has a replica and need an error detection check based on the flag; if the data has a replica and need the error detection check, the central control unit uses an error detection code associated with the data to check whether the data has an error; if the data does not have an error, then the data is outputted; and if the data has an error, then the replica is outputted.

17. The method according to claim 16, wherein the error detection code provides an error detection capability that is not lower than the data reliability requirement of the storage system.

18. The method according to claim 16, wherein the flag further represents that the data has a replica in the non-volatile memory.

19. The method according to claim 16, wherein the storage system further comprises a hard disk, and the flag further represents that the data have has a replica in the hard disk.

20. A storage system, comprising:
a storage media, comprising a non-volatile memory which is not divided into a plurality of segments respectively corresponding to the plurality of data reliability levels; and
a storage media controller, connecting with the non-volatile memory, comprising:
a memory unit, storing a non-volatile memory operation mode table comprising at least two modes, a first mode corresponding to a data reliability requirement of the storage system and a second mode corresponding to a second data reliability lower than the data reliability requirement of the storage system, and a data reliability reduction condition table comprising at least one condition;
a media control unit, connecting with the non-volatile memory; and
a central control unit, connecting with the memory unit and the media control unit, wherein the central control unit determines whether a system information associated with the data meets one of the at least one condition in the data reliability reduction condition table when the storage media controller performs a data writing operation, and if the system information meets the condition, the central control unit controls the media control unit to select an address meeting a wear-out limit of at least the second mode of the at least two modes in the non-volatile memory, and write the data into the address of the non-volatile memory based on the second mode.

21. The storage system according to claim 20, wherein the data reliability requirement comprises a data retention and an unrecoverable bit error rate, wherein the data retention is from 3 months to 10 years, and the unrecoverable bit error rate is from $10^{-13}$ to $10^{-16}$.

22. The storage system according to claim 20, wherein the storage media controller further comprises a data encoding/decoding unit connecting with the central control unit, and each of the modes in the non-volatile memory operation mode table corresponds to a combination of a wear-out limit, a write speed, and an encoding scheme, wherein the central control unit controls the data encoding/decoding unit to add an error correction code into the data based on the encoding scheme of the second mode, and the central control unit controls the media control unit to write the data into the address of the non-volatile memory based on the write speed of the second mode.

23. The storage system according to claim 20, wherein the storage media controller further comprises a data encoding/decoding unit and a data error detect unit connecting with the central control unit, and the data encoding/decoding unit adds an error detection code into the data, wherein the error detection capability of the error detection code meets the unrecoverable bit error rate requirement of the storage system, and the data error detect unit uses the error detection code to determine whether the data, written into the non-volatile memory using the second mode, have an error.

24. The storage system according to claim 20, wherein the storage media controller further comprises a timer unit connecting with the central control unit, and the timer unit periodically triggers the central control unit to check whether the elapsed time after the data whose associated system information meets the condition are written into the non-volatile memory approaches the data retention capability of the data.

25. The storage system according to claim 20, wherein the storage media controller further comprises a timer unit connecting with the central control unit, wherein the timer unit periodically triggers the central control unit to control the media control unit to rewrite the data whose associated system information meets the condition into the storage media with a data reliability greater than or equal to the data reliability requirement of the storage system.

26. The storage system according to claim 20, wherein the condition comprises that the data has a high performance sensitivity, the data has a short data lifetime, and the data has a replica.

27. The storage system according to claim 20, wherein the storage media further comprises a hard disk connecting with the media control unit, and the non-volatile memory serves as a cache of the hard disk.

28. The storage system according to claim 20, wherein the non-volatile memory can accept a write command issued by the media control unit, wherein the write command corresponds to a data reliability lower than the data reliability requirement of the storage system, and the second mode comprises using the write command.

29. The storage system according to claim 20, wherein the storage media controller further comprises a data encoding/decoding unit, wherein the data encoding/decoding unit adds a concatenated code into the data, wherein the concatenated code comprises a first error correction code and a second error correction code, and the data encoding/decoding unit receives a control signal from the central control unit, wherein the control signal controls the data encoding/decoding unit to add the first error correction code into the data without the second error correction code, and the first error correction code corresponds to a data reliability lower than the data reliability requirement of the storage system, and the second mode comprises using the control signal.

* * * * *